United States Patent

Saljé

[11] Patent Number: 4,640,057
[45] Date of Patent: Feb. 3, 1987

[54] DRESSING-GRINDING PROCESS AND ELECTRONICALLY CONTROLLED GRINDING MACHINE

[76] Inventor: Ernst Saljé, Steintorwall 12, 3300 Braunschweig, Fed. Rep. of Germany

[21] Appl. No.: 589,096
[22] PCT Filed: Jun. 6, 1983
[86] PCT No.: PCT/EP83/00145
§ 371 Date: Jan. 26, 1984
§ 102(e) Date: Jan. 26, 1984
[87] PCT Pub. No.: WO83/04322
PCT Pub. Date: Dec. 8, 1983

[30] Foreign Application Priority Data

Jun. 5, 1982 [DE] Fed. Rep. of Germany ....... 3221397

[51] Int. Cl.⁴ .............................................. B24B 53/00
[52] U.S. Cl. .................... 51/165.87; 51/325; 125/11 CD
[58] Field of Search ........................ 125/11 R, 11 CD; 51/165.87, 165.88, 165.77, 325

[56] References Cited

U.S. PATENT DOCUMENTS

| | | | |
|---|---|---|---|
| 1,666,237 | 4/1928 | Fuller | 51/165.87 |
| 3,167,891 | 2/1965 | Coes | 125/11 R |
| 3,698,138 | 10/1972 | Wada | 51/165.8 |
| 4,018,010 | 4/1977 | Pozzetti | 51/165.88 |
| 4,118,900 | 10/1978 | Moritomo | 51/165.87 |
| 4,163,346 | 8/1979 | Matson | 125/11 R |
| 4,222,362 | 9/1980 | Kaiser | 125/11 CD |
| 4,422,362 | 12/1983 | Chibana . | |
| 4,475,321 | 10/1984 | Meyer | 125/11 CD |
| 4,483,103 | 11/1984 | Bickel | 125/11 CD |
| 4,535,571 | 8/1985 | Smith | 51/165.87 |

Primary Examiner—Harold D. Whitehead
Attorney, Agent, or Firm—Andrus, Sceales, Starke & Sawall

[57] ABSTRACT

A dressing-grinding process for electronically controlled grinding machines for plain or surface grinding of workpieces is described. In order to maintain the effective rough depth during the grinding process, while the roller RPM must be selective and the feed of the dressing roller against the grinding wheel must be continuous, the dressing roller carrier is continuously fed against the grinding wheel carrier in accordance with the functions $$v_{frd}(t) = a_{ed}(t) \cdot n_s(t) = \frac{v_s}{\pi} \cdot \frac{a_{ed}(t)}{d_s(t)} = \frac{v_s}{\pi} \cdot \frac{a_{ed}(t)}{2(y_s(t) - y_w(t))}$$

wherein is:
$v_{frd}(t)$: feed speed of the dressing roller carrier slide (31) relative to the grinding wheel slide
$a_{ed}(t)$: dressing feed per revolution
$n_s(t)$: grinding wheel revolutions
$d_s(t)$: grinding wheel diameter
$t$: current time
$v_s$: grinding wheel circumferential speed; for the described example of a straight grinding wheel it equals the grinding wheel speed $v_c$. Thus $v_c = v_s$.
$y_s(t)$: vertical coordinate of the wheel center
$y_x(t)$: workpiece dimension in y direction.

17 Claims, 19 Drawing Figures

DRESSING-GRINDING PROCESS AND ELECTRONICALLY CONTROLLED GRINDING MACHINE

The present invention relates to a process and apparatus in which a grinding wheel is dressed while a work piece is being ground and more particularly to maintaining a constant effective rough depth during grinding the work piece.

HOWES: The Technique of Dressing During Grinding Proceeding, published in International Conference on Creepfeed Grinding, Bristol, 1979, suggests that dressing be done during grinding.

The advantage of dressing during grinding is that the profile, i.e. the precision of the grinding wheel, as well as its sharpness, i.e. its cutting ability, are preserved. Dressing during grinding is accomplished primarily with diamond profile dressing rollers. Dulling is thus eliminated. Profile variations, which show up in the workpiece as first degree defects, no longer occur. The service life in the grinding process is theoretically unlimited and time requirements for traditional dressing are eliminated.

During dressing-grinding the grinding wheel topography has a roughness which corresponds to the effective rough depths $R_{ts}$. Time variation in grinding wheel topography, which in traditional grinding processes can be described, among others, with the time constant $T_s$, do not occur in dressing-grinding. In other words, the effective rough depths $R_{ts}$, which, as is well known, can be viewed as the criterion for the wheel topography, move on the axis $t_c=0$ during dressing-grinding. In the past, dressing processes which occur during grinding have been executed with constant dressing feed speed. Consequently, the equation $v_{frd}=a_{ed}n_s(t)$ has been applied, wherein $v_{frd}$ is the feed speed of the dressing roller relative to the grinding wheel, $a_{ed}$ is the infeed per grinding wheel revolution, and $n_s(t)$ is the speed of the grinding wheel. The speed of the grinding wheel $n_s(t)$ is variable in order to hold the grinding speed constant with decreasing grinding wheel diameter.

It is the object of the invention to retain the effective rough depth during the grinding process, while the roller speed is variable and the infeed of the dressing roller to the grinding wheel is continuous. The object is achieved with the process described.

The infeed $a_{ed}$ included in the dressing feed speed $v_{frd}=a_{ed}\cdot n_s(t)$ and the speed quotient $q_d$ determine the initial effective rough depth $R_{tso}$ during dressing with a diamond profile roller. The initial effective rough depth $R_{tso}$ must be adjusted to the grinding process which follows the dressing process (in this case, no later than one wheel revolution).

In dressing-grinding the occurring dressing wheel topography, which can be well described by the effective rough depth $R_{ts}$, is simultaneously the topography which becomes effective for the grinding process.

Therefore, the topographies which are proper and necessary for grinding processes can be created during dressing-grinding via kinematical adjustment values ($q_d$ and $a_{ed}$). It may become necessary—for example during grinding cycles—to have the speed quotient $q_d$ or the dressing feed $a_{ed}=v_{frd(t)}/n_s(t)$ follow certain functions of time or workpiece dimensions. By proper control of the dressing feed $a_{ed}$ wheel volume can be saved which otherwise are lost because of the dressing; or with the speed quotient $q_d$ close to +1 good conditions can be created for high limit time chip volume.

With the radial dressing feed distance $l_{frd}(t)=a_{ed}\cdot n_s(t)\cdot t_d$, wherein $t_c=t_d$ is the dressing or grinding time, the grinding wheel diameter $d_s(t)$ changes. In order to properly control the effective point or effective line between the grinding wheel and the workpiece by which the workpiece dimensions are affected, it is necessary to synchronize the feed movement of the dressing roller and the respective movement of the grinding wheel feed.

This is best achieved by means of a small computer which receives the input of adjustment and measuring values.

The invention is further explained in the following detailed description taken with the drawing having the following figures.

Figure 13:
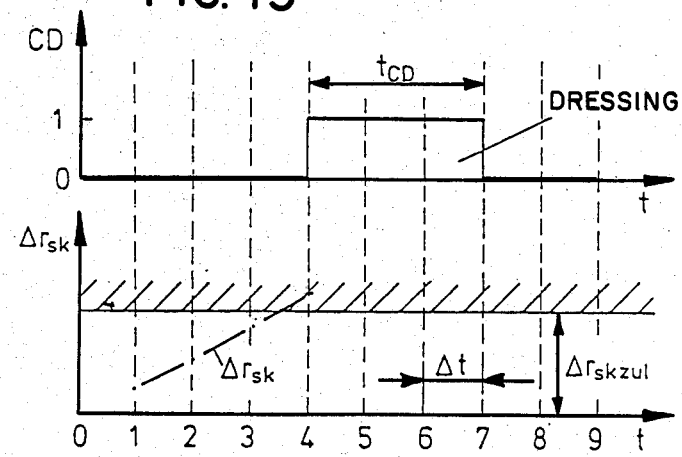

FIG. 13 schematically shows another technique for measuring the wear of the grinding wheel.

Figure 14:
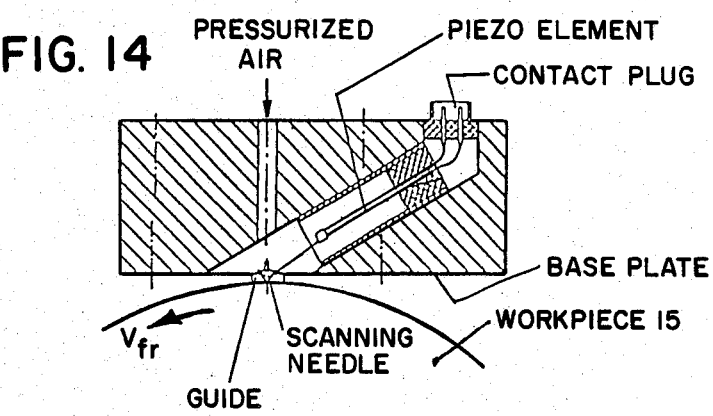

FIG. 14 shows apparatus for measuring the rough grinding depth of the workpiece.

Figure 15:
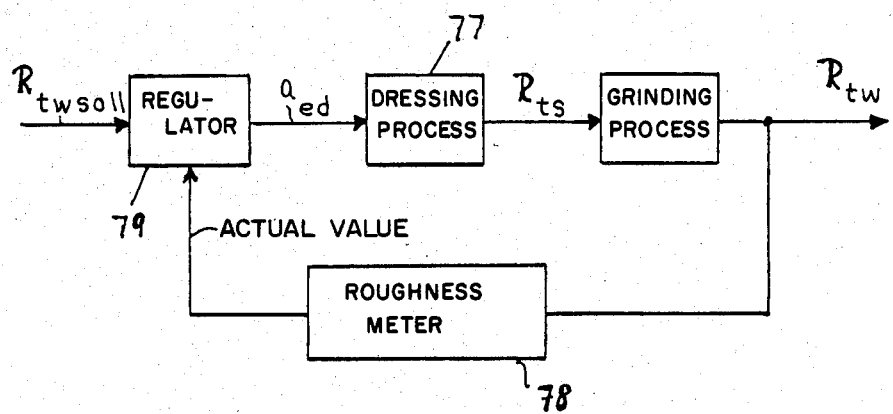

FIG. 15 shows circuitry for controlling the dressing action in accordance with rough depth.

Figure 3:
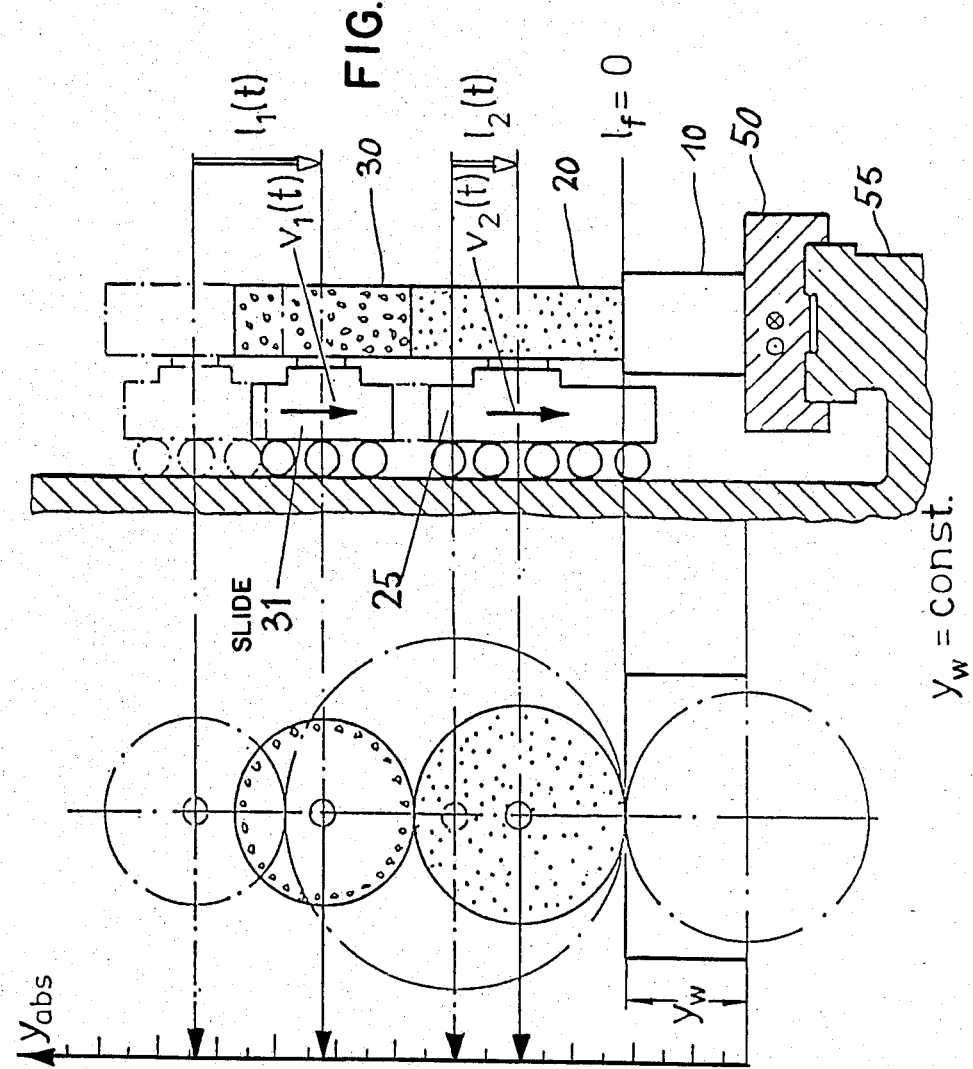
FIG. 3 shows the operation of apparatus suitable for carrying out the process in the example of FIG. 1.
Figure 4:
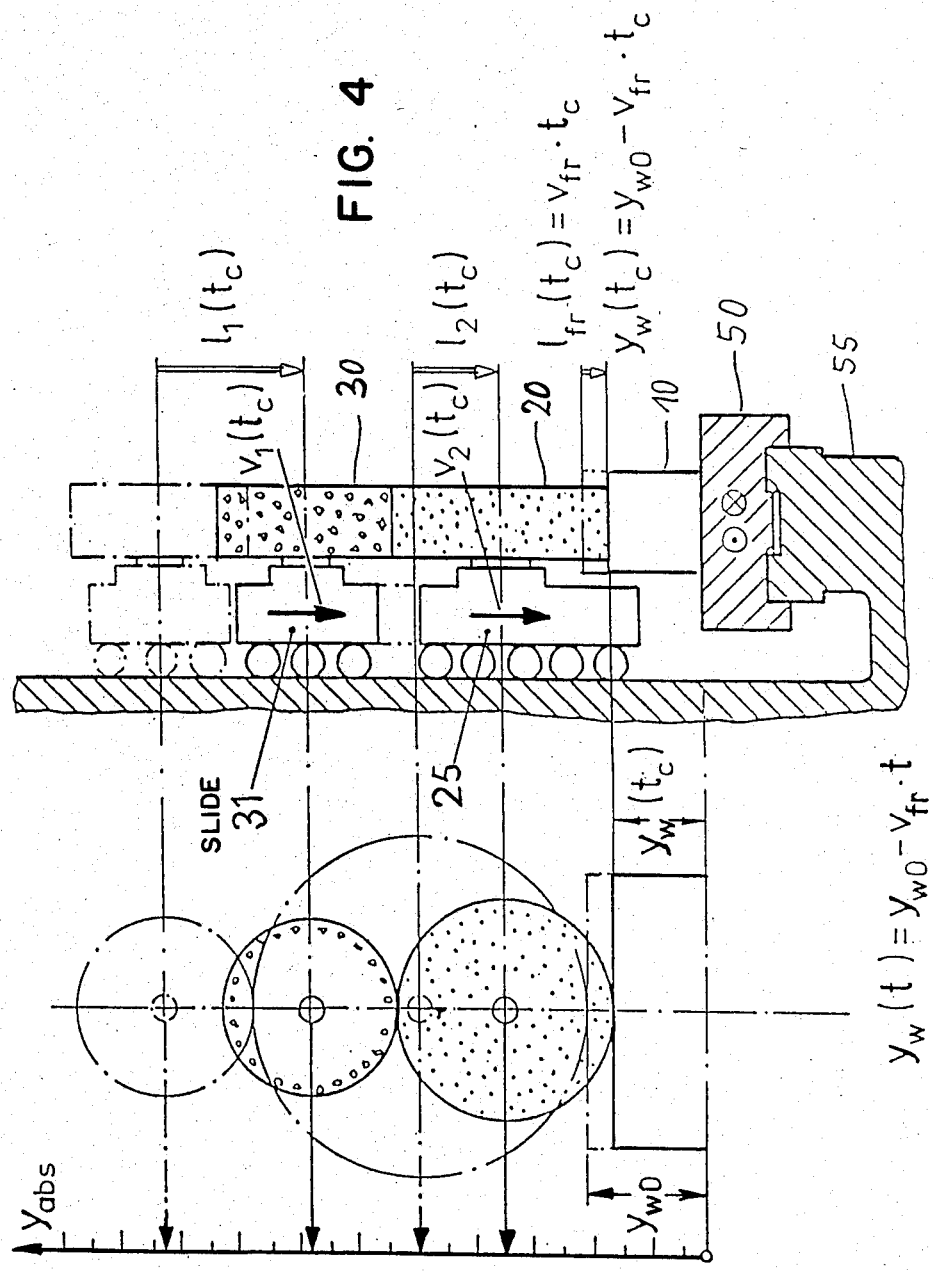
FIG. 4 shows the operation of apparatus shown in FIG. 3 carrying out the process in the example of FIG. 2.
Figure 16:
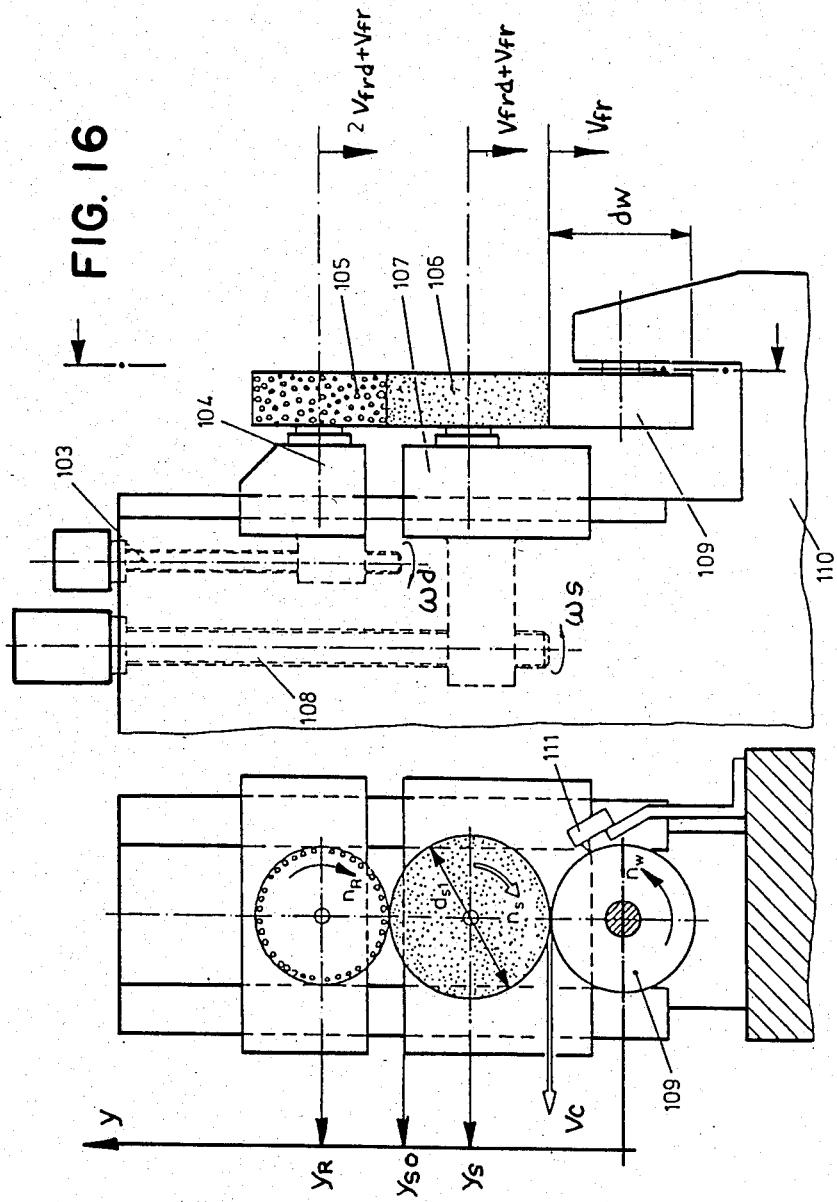

FIG. 16 is a view similar to FIGS. 3 and 4 showing modification of the apparatus.

Figure 17:
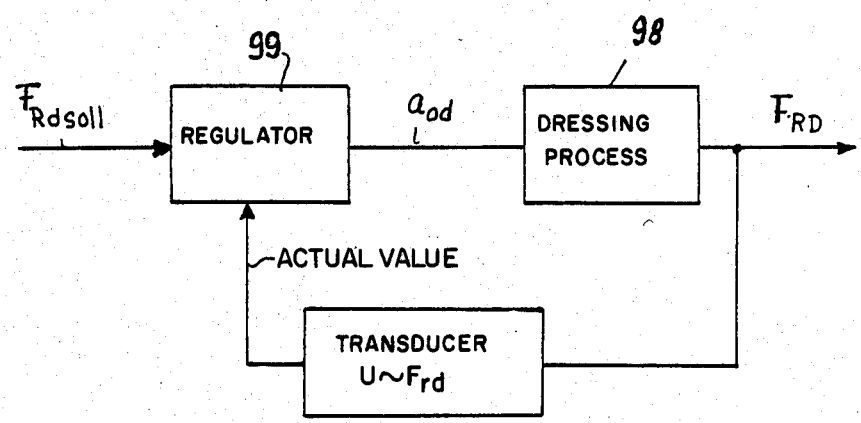

FIG. 17 is a schematic diagram of circuitry suitable for controlling operation of the process responsive to radial dressing feed force.

Figure 18:
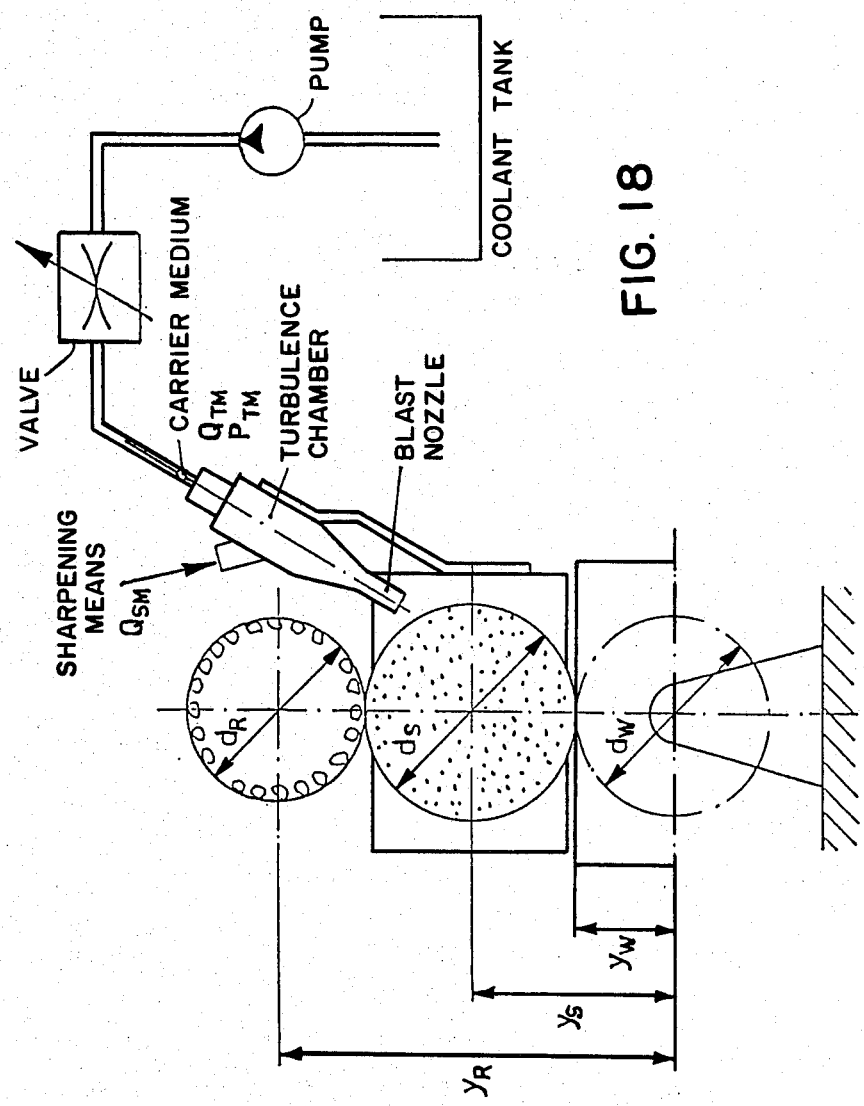

FIG. 18 is a schematic diagram showing a jet lapping unit.

Figure 19:
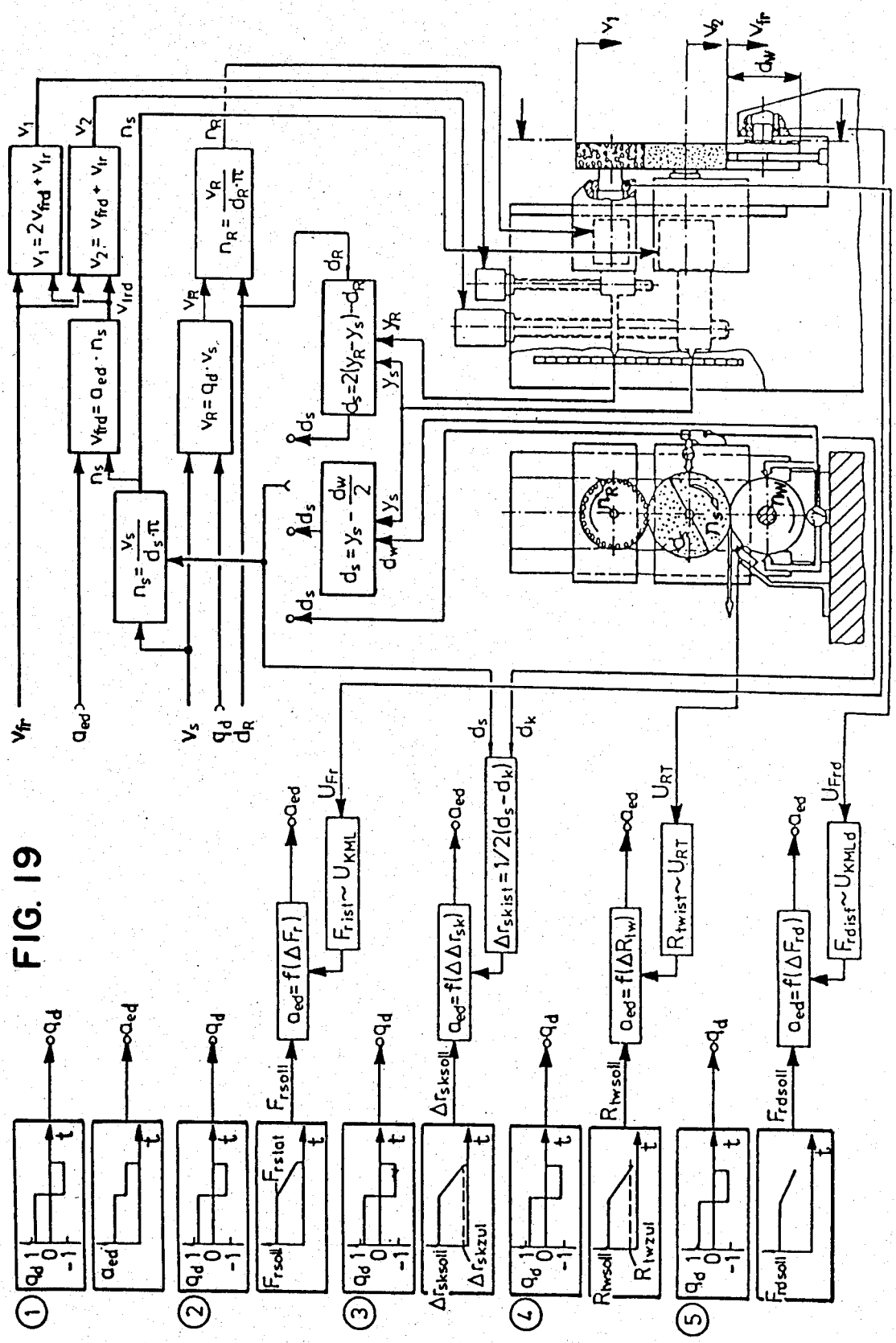
Figure 19:
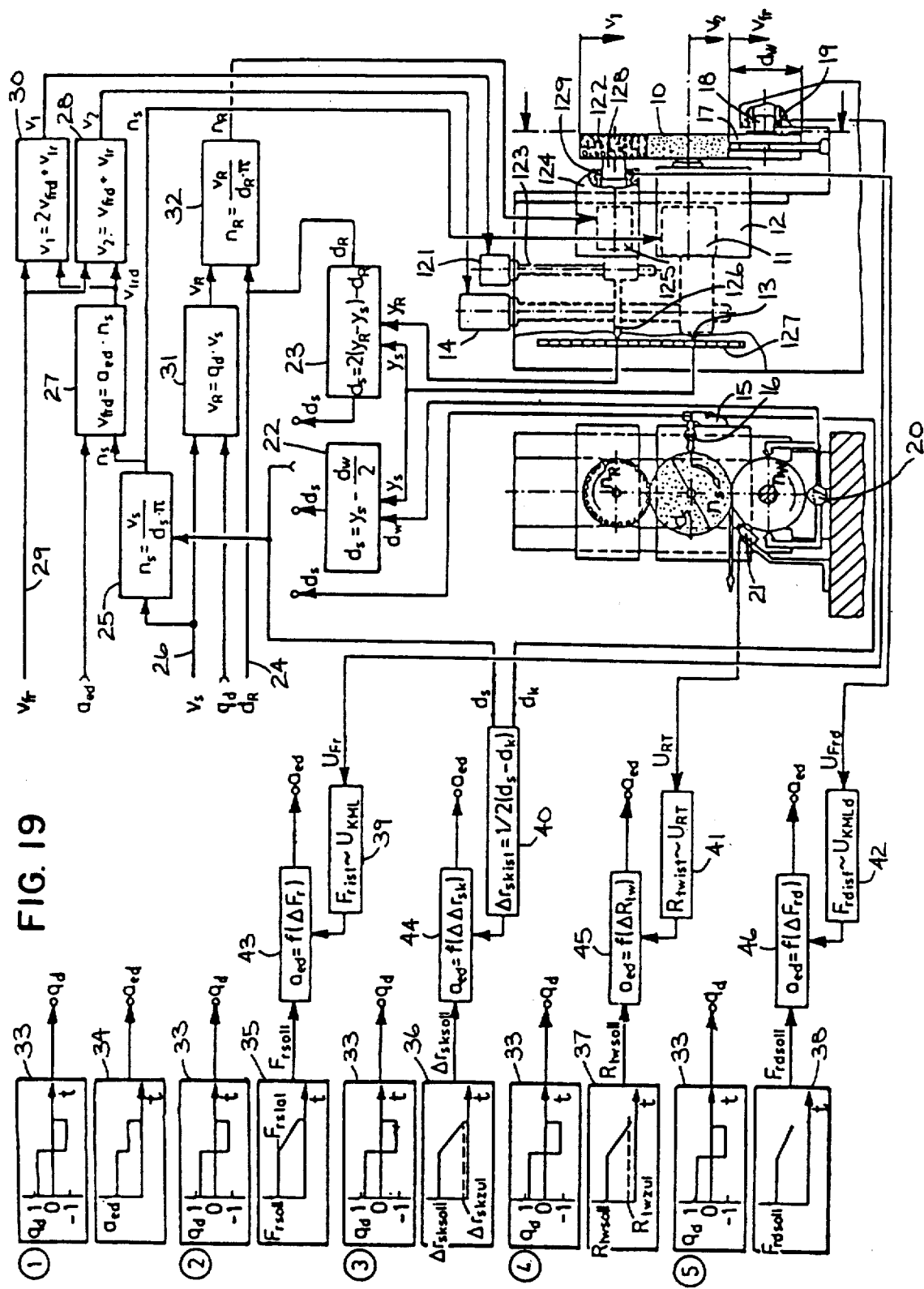

FIG. 19 is a detailed showing of the grinding machine apparatus.

A few examples may serve to demonstrate how the feed movements and feed speeds of the dressing roller and the grinding wheel can be synchronized during surface grinding and plain plunge-cut grinding (see FIGS. 1-4).

Figure 1:
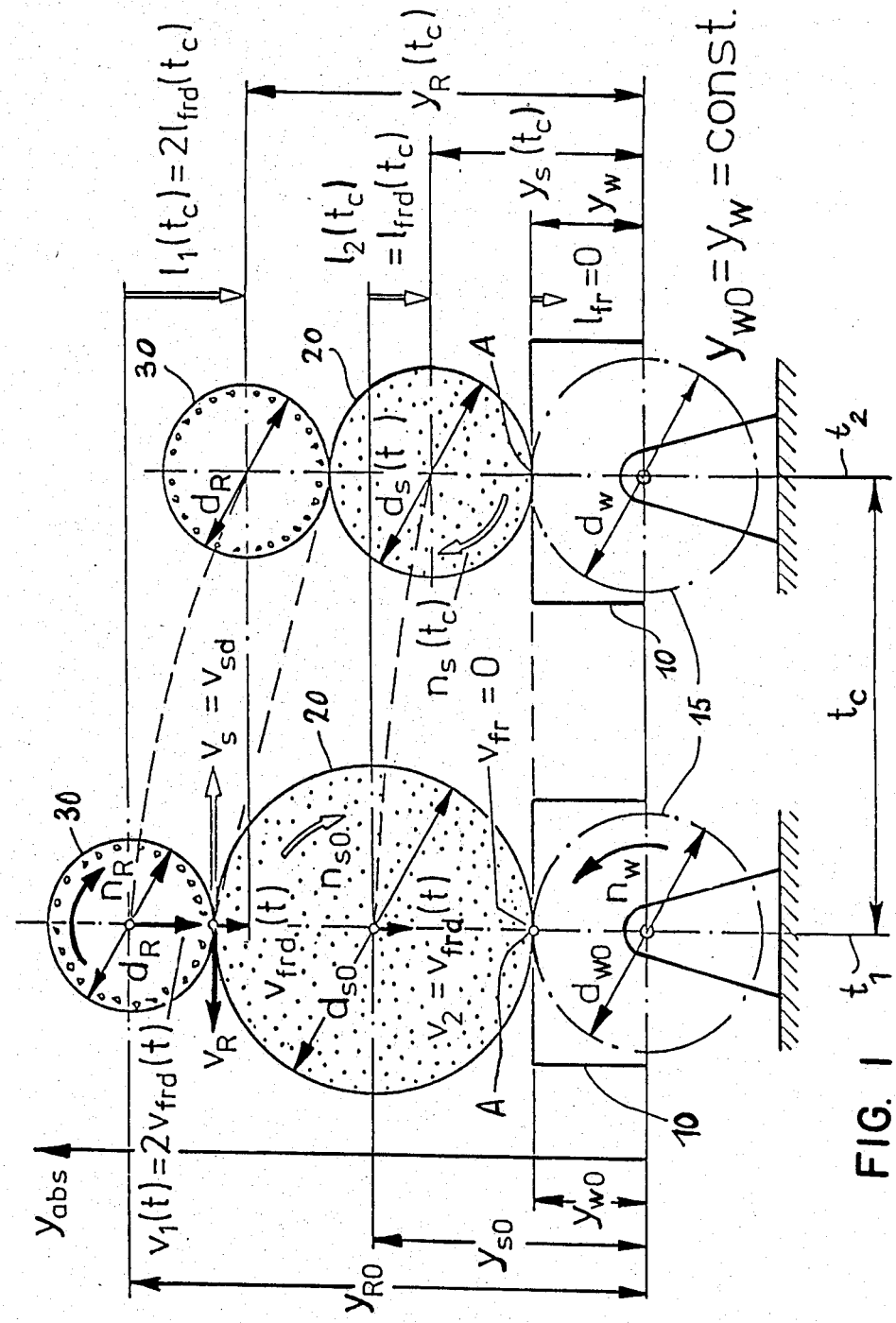
FIG. 1 is a schematic diagram showing the dressing-grinding process of the present invention at the beginning and end of a process occupying the time $t_c$.

FIG. 1 shows the diagram of the feed of a dressing roller 30 and of a grinding wheel 20 relative to a workpiece which can be either a block 10, which is to be surface ground, or a disk 15, which is to be plain ground. The feed is shown at the moment t=0, i.e. at the start of the grinding operation, and at the moment t=$t_c$. To begin with, let it be assumed that the effect point A of the grinding wheel 20 remains at the same height of the workpiece 10,15. The machine coordinates $y_{s0}$ and $y_{R0}$ relate to the position of the dressing roller 30, of the grinding wheel 20, and of the workpiece 10, 15 in the initial position. In case that $y_w(t)=y_w=$is constant, nothing is ground off the workpiece 10, 15 as measured in the depth. It is $l_{fr}(t)=l_{fr}=0$. Such a case can occur in deep surface grinding, for example. Let it be assumed in all observations which are now made that the dressing feed $a_{ed}$ is constant. Furthermore, let a constant dressing roller speed be assumed. For the grinding let it be assumed that the grinding speed $v_c=v_s$ is constant. Thus the following applies:

$$v_s = v_{sd} = d_s(t) \cdot \pi \cdot n_s(t) \qquad \text{(equ. 1)}$$

wherein $d_s(t)$ is the diameter and $v_{sd}$ is the peripheral speed of the grinding wheel during dressing.

At the moment t=0, the following then applies:

$$v_{frd0} = a_{ed} \cdot n_{s0}; \; n_{s0} = v_{sd} \frac{1}{\pi \cdot d_{s0}} \qquad \text{(equ. 2)}$$

wherein the further subscripts relate to t=0.

Figure 6:
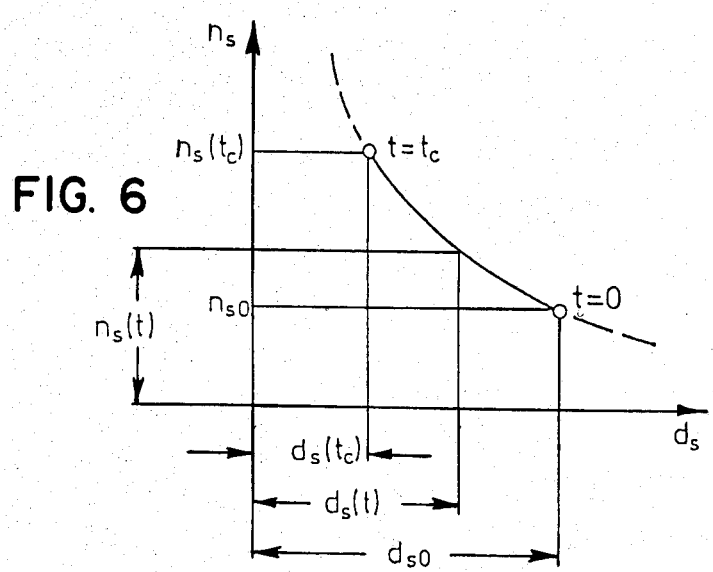
FIG. 6 shows the hyperbolic relation between grinding wheel speed and grinding wheel diameter.

With the condition of constant cutting speed a hyperbolic relation results between the grinding wheel speed $n_s(t)$ and the grinding wheel diameter $d_s(t)$, as shown in FIG. 6.

$$n_s(t) = \frac{v_s}{\pi \cdot d_s(t)} = \frac{v_{sd}}{\pi \cdot d_s(t)} \qquad \text{(equ. 3)}$$

A hyperbolic relation between $n_s(t)$ and $d_s(t)$ results, together with the requirement of constant dressing feed $a_{ed}$ for the radial infeed speed of the dressing roller 30 relative to the grinding wheel 20 $v_{frd}(t)$ and the corresponding radial feed, in $l_{frd}(t)$ non-linear equations. With the above equation, the following is valid for $v_{frd}(t)$:

$$v_{frd}(t) = n_s(t) \cdot a_{ed} = \frac{v_{sd} \cdot a_{ed}}{\pi \cdot d_s(t)} \qquad \text{(equ. 4)}$$

On the other hand, $v_{frd}(t)$ is half of the temporal variation of the grinding wheel diameter during dressing:

$$v_{frd}(t) = -0.5 \cdot \frac{dd_s(t)}{dt} \qquad \text{(equ. 5)}$$

To start with, by elimination of $v_{frd}(t)$, equations 4 and 5 result, after integration, in the grinding wheel diameter as a function of time:

$$d_s(t) = \sqrt{\frac{-4a_{ed} \cdot v_{sd}}{\pi} \cdot t + d_{s0}^2} \qquad \text{(equ. 6)}$$

If we now differentiate from $d_s(t)$ according to (equ. 5), we get $$v_{frd}(t) = \frac{a_{ed} \cdot v_{sd}}{\pi \cdot \sqrt{\frac{-4a_{ed} v_{sd}}{\pi} \cdot t + d_{s0}^2}} \qquad \text{(equ. 7)}$$

The radial feed travel $l_{frd}(t)$ of the dressing roller 30 relative to the grinding wheel 20 is calculated from the grinding wheel diameter with (equ. 6) at $$l_{frd}(t) = 0.5(d_{s0} - d_s(t)) = 0.5 \left( d_{s0} - \sqrt{\frac{-4a_{ed} \cdot v_{sd}}{\pi} \cdot t + d_{s0}^2} \right) \qquad \text{(equ. 8)}$$

After the grinding time $t=t_c$ the absolute feed travel of the dressing roller 30 is $l_1(t_c)=2l_{frd}(t_c)$, and the adjustment distance of the grinding wheel is $l_2(t_c)=l_{frd}(t_c)$.

Figure 2:
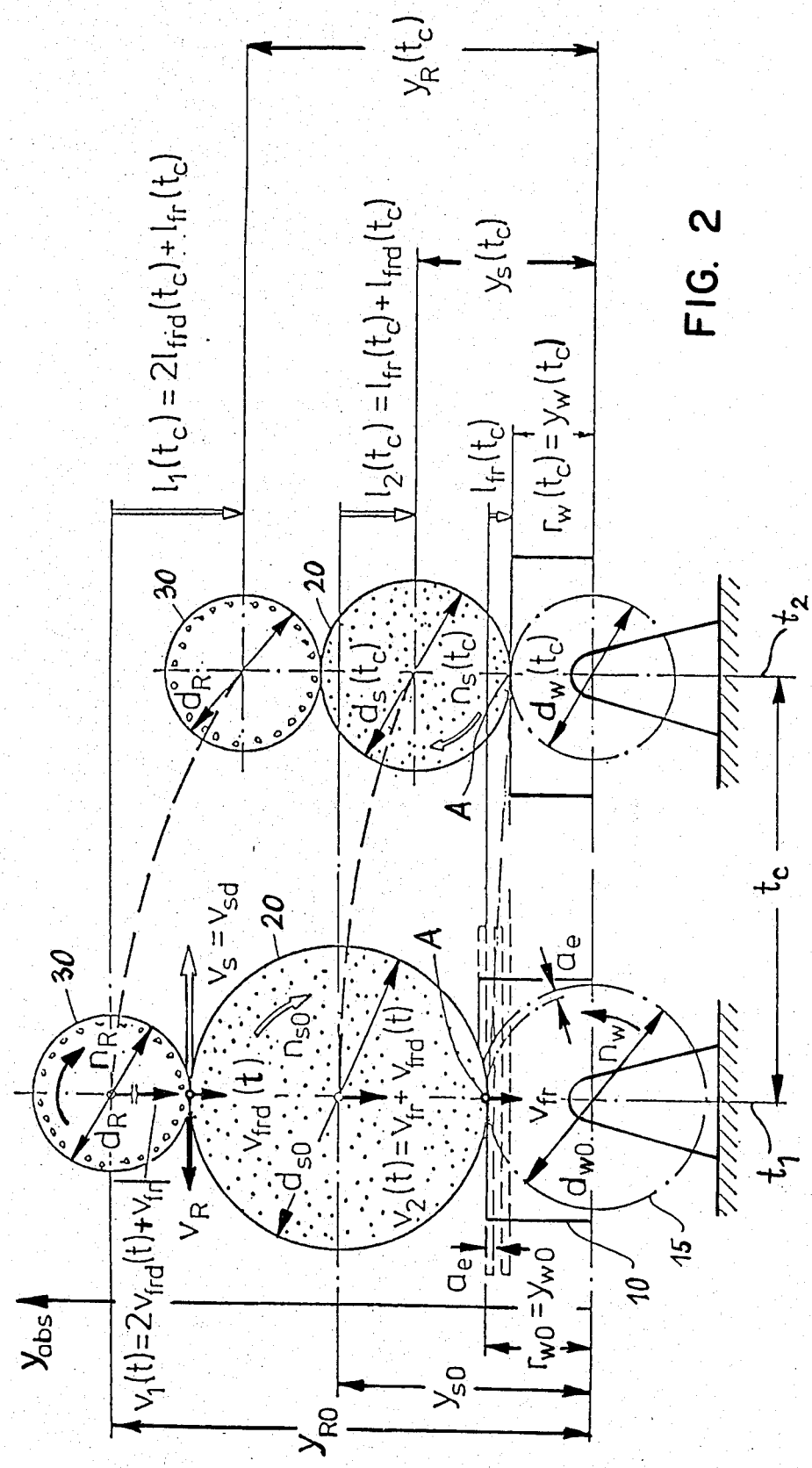
FIG. 2 is a schematic diagram similar to FIG. 1 but showing the effect of material removal from the workpiece on the process.

With FIG. 2, which is analogous with FIG. 1, we start with the assumption that the workpiece dimension changes, in other words, that the height $y_w(t)$ of the workpiece 10 is ground down during surface grinding or the radius $r_w(t)$ of the workpiece 15 is ground down during plain grinding as a function of time. Expressed differently, this means that the effective point A is displaced with the original coordinate $r_{wo}$ or $y_{wo}$.

FIG. 2 results from FIG. 1 by superposition of the feed travel $l_{fr}(t)$, and we get $$y_x(t) = y_{wo} - l_{fr}(t)$$

There now results the absolute feed travel $l_1(t)$ of the dressing roller 30, the absolute feed travel $l_2(t)$ of the grinding wheel 20 and the actual feed travel $l_{fr}(t)$ at the workpiece 10, 15. The absolute amounts of the instantaneous speeds $v_1(t)$ and $v_2(t)$ can be read from FIG. 2 and FIG. 1 as the inclination of the center tracks of the dressing roller and the grinding wheel.

FIGS. 3 and 4 show an example of the construction. On the longitudinal slide of a grinding machine with frame 55 the workpiece is set and chucked (10), which is to be ground by the grinding wheel 20. The grinding wheel 20 and the dressing roller 30, which are in constant mesh during grinding, are each mounted on a slide 25, 31, wherein both slides 25, 31, as an example, are placed above one another and are vertically movable in the frame 55. Here, a presentation was chosen in which both slides 31 and 25 are guided separately for the diamond dressing roller as well as for the grinding wheel 20; consequently, they can execute absolute movements relative to the vertical coordinate y of the frame 55. Other construction configurations are possible, in which the slide 31 with the dressing roller 30 moves relative to the slide 25 of the grinding wheel 20, i.e. is placed on the latter. In principle, further kinematic solutions are possible; these, however, have no essential effect on the absolute feed distances which must be traveled and on the speeds, so that is suffices to describe only one configuration.

The moment $t=t_c$ is shown; the start of the grinding process $t=0$ is depicted with a dotted line. While the workpiece dimensions in FIG. 3 do no change, i.e. $l_{fr}=0$, the workpiece in FIG. 4 is ground down as a function of time.

For reasons of clarity the round body (workpiece) for plain grinding is not drawn into FIGS. 3 and 4. It is evident, however, that the above principle can be applied in the same manner to plain grinding of a workpiece. This can be seen clearly in FIG. 5, in which a tracks 55, which are set off axially inward and run transverse to the shaft 54. A measuring slide 44 can be moved on the tracks 55 traverse to the shaft by means of a guide 43; the measuring slide 44 can be pushed toward the grinding wheel 41 and retracted by a motor 47. The housing 45 of the measuring slide 44 contains a feeler 52, which can be moved radially to the grinding wheel 41 by means of a solenoid 46. The feeler 52, which is loaded by a spring 56 in the housing 45, protrudes from the housing 45 and is designed as a capacitive switch. The output lines 58, 59 are connected to the capacitive switch 57; and lead to a regulator 6. The output conductors 61, 62 of the regulator 66 are connected to the advance motor 47 for the measuring slide 44.

A rear arm of the measuring slide 44 is equipped with a photodiode measuring head 49 or a similar device, which scans a linear ruler 48, which in turn is permanently attached to the headstock. The linear ruler 48 is located in an input circuit 63, 65 of a processing unit 60, which has as a further input an input circuit 64, which is connected with the measuring head 49. From the signals received from the circuits 63, 64, 65, which represent the relative position of the measuring slide 44 relative to the headstock 42 and thus to the wheel 41, the processing unit determines the actual diameter $d_s(t)$. The electric motor 47 drives a spindle 67, which in turn is coupled with the measuring slide 44, so that the measuring slide can be moved along the alignment 43 by rotation of the spindle 67 in the manner described earlier.

When the measuring slide 44 is moved toward the grinding wheel 41 at a certain feed speed, which is proportional to the angular velocity of the spindle 67, the spindle 67 turns at a certain angle $\phi$. When the grinding wheel 41 is touched by the feeler 42 at the outer points of the grinding wheel 41, further advance of the measuring slide 44 creates a signal on circuits 58, 59, the transient response of which signal corresponds to a step function. This signal is received by the regulator 66 and sent to the electric motor as a stop signal via circuits 61, 62. When the measuring slide has stopped (44), the processing unit 60 receives a signal from the measuring head 49, which represents the measuring head's relative position to the linear ruler 48 and thus to the grinding wheel 41; from this signal, the processing unit determines the actual diameter of the grinding wheel. When the diameter of the grinding wheel 41 has been measured at its outer points in this manner at two consecutive, defined points in time, the processing unit 60 calculates the value of the so-called edge-wear $\Delta r_{sk}$ from the received signals.

Instead of a capacitive feeler 52 a solids sonometer can be used whose output signal is received by the regulator 66.

During the operation of grinding and dressing processes it must be assumed that disturbance variables occur which can stocastically affect the operation of the process. A disturbance variable can be, for instance, the inhomogeniety or the varying machining allowance of the workpiece. Disturbance variables result, for example, in fluctuating cutting powers, possibly also varying grindability of the workpiece material. In continuous dressing it is important, among other things, that as little grinding wheel volume as possible is trimmed. The dressing volume flow of the wheel must be small. For this reason only enough must be trimmed from the grinding wheel that it remains sharp and profile-true.

Figure 10:
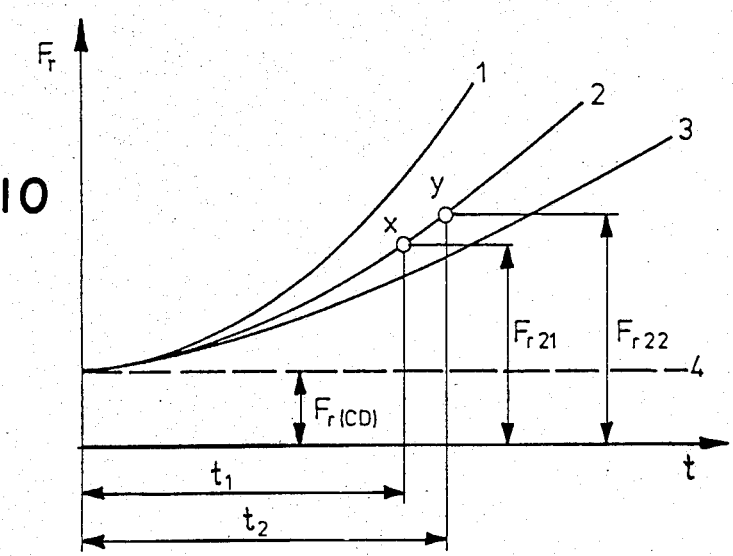
FIG. 10 is a graph showing the relation of the radial force applied to the grinding wheel by the dressing wheel as a function of time.

It has been shown in many deep-grinding tests that the radial force $F_r$ or the normal force $(F_n)$ increases as a function of time. The increase of this radial or normal force must be viewed as a result of a dulling or adding effect during griding. The wheel loses its sharpness. In continuous dressing processes the radial forces remain approximately constant. Such a typical process is shown in FIG. 10. The radial force $F_r$ appears as a function of time with the curves 1, 2, 3, which indicate that materials with varying degrees of grindability can result in an increasing force as a function of time. In all three cases a continuous dressing process is not used. The dashed curve 4, on the other hand, shows the expected development during the continuous dressing process. The grinding wheel remains continuously sharp and consequently the force does not increase; it remains constant as a function of time. However, there is also the grinding wheel dressing volume flow $Q'_s$, caused by the dressing mechanism, which unfavorably affects the economy of operation. The volume flow $Q'_s$ during dressing per millimeter of grinding wheel width is calculated at $$Q'_s \sim a_{ed} \cdot V_{sd}$$

It can be seen that the grinding wheel volume flow $Q'_s$ is proportional to the feed $a_{ed}$. The feed $a_{ed}$, on the other hand, is dependent on the feed speed $v_{frd}$ of the dressing roller relative to the grinding wheel, and it is in inverse proportion to the number of revolutions of the grinding wheel. One can assume that the peripheral speed of the grinding wheel is held constant during grinding and dressing. This is possible, for example, by means of the adjustment described further on. The equation for the dressing volume flow states that the volume flow is directly proportional to the feed speed $(v_{frd})$ of the dressing roller to the grinding wheel. One can define a feed speed $v_{frd\ min}$ where the grinding force just barely remains constant. This must be maintained, in order to gain the advantage of continuous dressing with minimum grinding wheel dressing volume flow.

Figure 11:
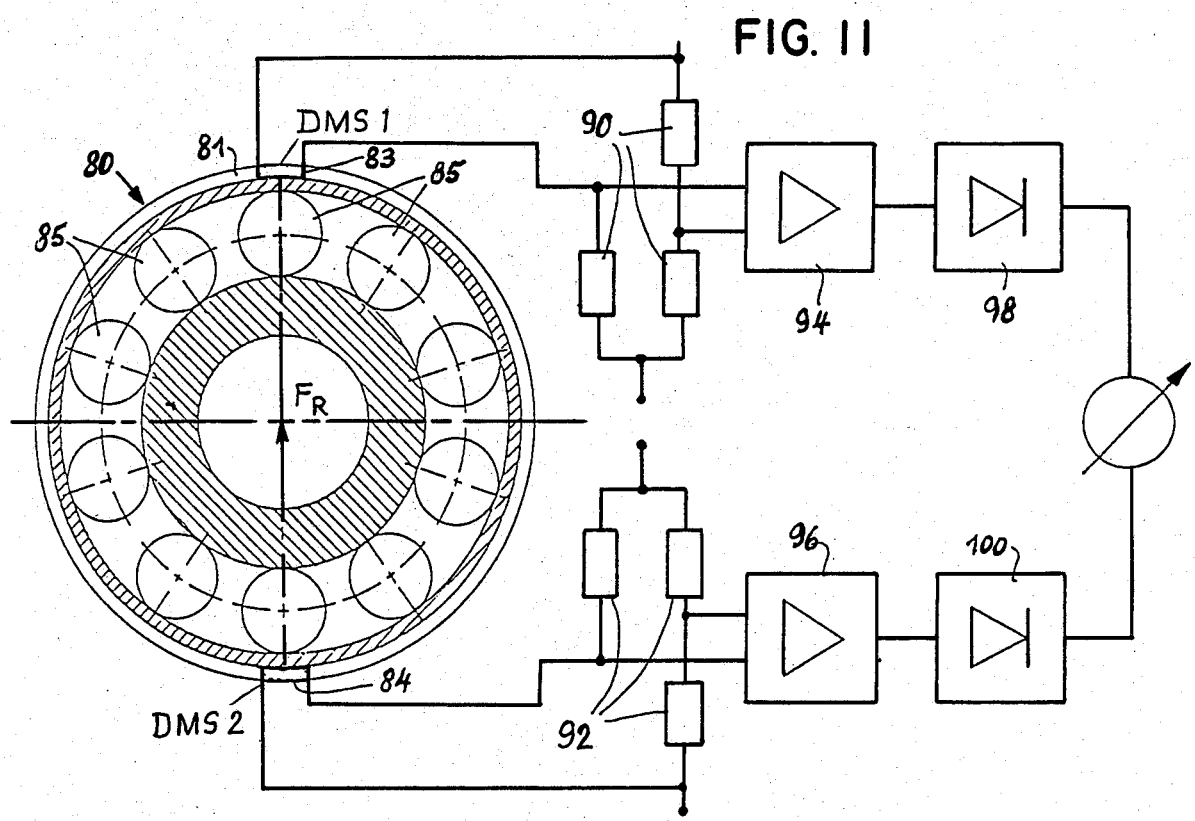
FIG. 11 shows a means for measuring the radial force.

The grinding force, which now is to function as a measuring value, must be measured by installing a corresponding measuring device in the flux of force of the machine. For this purpose the workpiece can be supported, for example, against the grinding wheel slide via piezo elements. Then the flux of force closes across the piezo elements; these can be calibrated and a signal can thus be obtained which is proportional to the radial force. A different measuring principle is explained in FIG. 11, in which the radial force $F_r$ is measured by means of strain measuring strips in the radial ball bearing of the main spindle. Into the outer race 81 of the ball bearing 80 of, for example, the grinding wheel or the pivoted workpiece, two grooves 83, 84 are ground above the roller body track, into the bottom of which grooves strain measuring strips $DMS_1$, $DMS_2$ are glued. As a result of the rolling over of the roller bodies 85 strains and compressions occur in the bearing race, which cause resistance changes in the strain measuring strips. The rolling-over of the strain measuring strips is represented as alternating voltage. For the purpose of evaluation the signal is converted into a direct voltage in an active rectifier. Each measuring strip is complemented with fixed resistors 90, 92 to become a full bridge, and the measuring voltages are increased (94,96) and rectified (98,100), and the difference is formed in a subtractor. The voltage at the output of the subtractor round workpiece is depicted in addition to the flat workpiece.

To permit the control of the dressing process during grinding, the grinding wheel diameters and the slide position for the dressing roller 30 and the wheel 20 must be known. Modern NC-controlled grinding machines have measuring systems with which the position of the slides 31, 25 can easily be measured.

Figure 5:
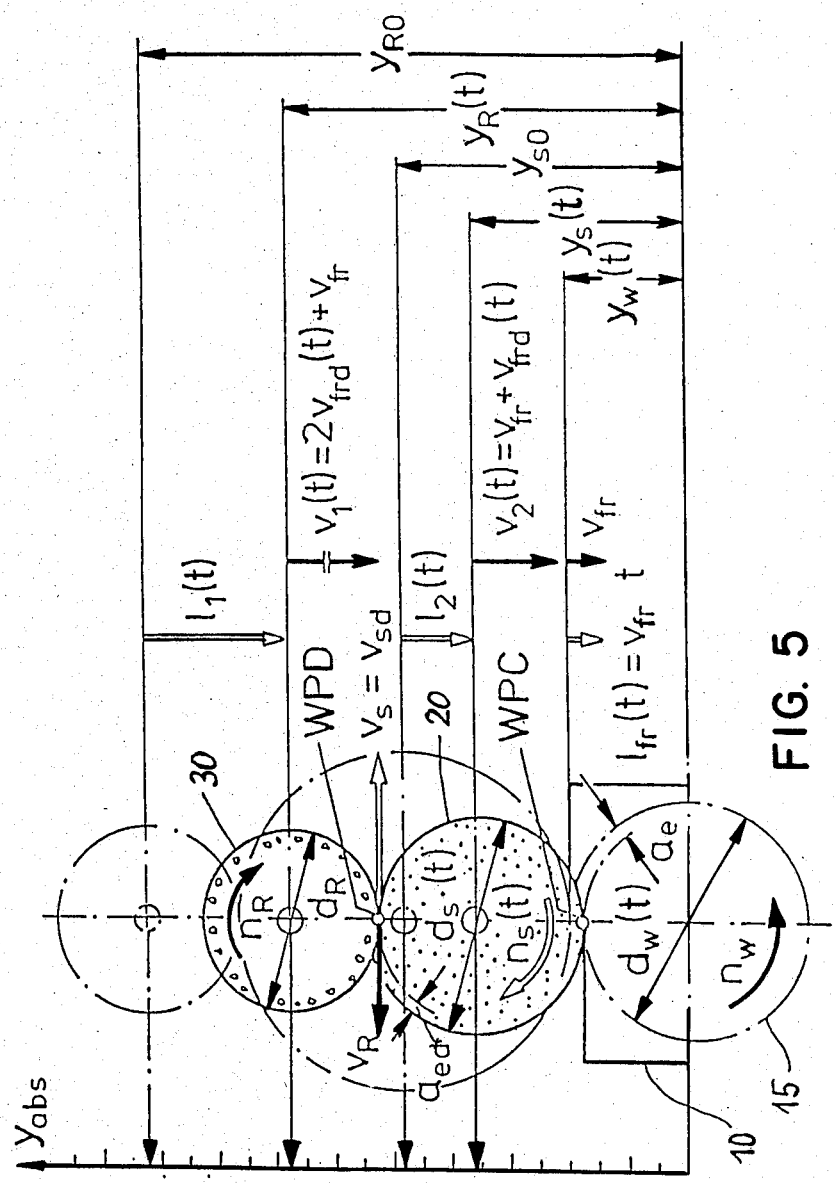
FIG. 5 shows operation of the process with a circular workpiece.

FIG. 5 shows the absolute machine coordinates $y_{abs}$, which can be converted at any time into relative distances. First we shall observe the examples given herein with absolute coordinates. In principle nothing changes when one switches to relative coordinates, for instance the position of the dressing roller slide 31 relative to the position of the grinding wheel carrier slide 25. The data of the coordinates $y_{so}$ and $y_s(t)$, which are measured at every moment of the dressing and grinding process, are prerequisite to the use of a micro-computer which, for example, advances at every moment the necessary plunge-cut speed $v_{frd}(t)$ for the dressing roller unit with dressing roller 30. Equation 3 provides a mathematical condition for the operation of these two processes. It is assumed that the number of revolutions $n_R$ of the dressing roller, and thus also the dressing roller speed $v_R$, is constant for a specific duration. Dressing roller wear cannot be expected. Consequently, we assume—as mentioned above—that the grinding speed $v_s$ is constant, but simultaneously becomes the peripheral speed of the dressing roller $v_{sd}$ during dressing.

From the coordinates $y_s(t) - y_w(t) = r_s(t) = d_s(t)/2$ the grinding wheel diameter can be calculated. However, the grinding wheel diameter $d_s(t)$ is also derived from the measuring system at $$d_s(t) = 2(y_s(t) - y_w(t)) \qquad \text{(equ. 9)}$$

Thus, with a combination of the above mentioned equations (4) and (9), the following applies:

$$v_{frd}(t) = \frac{a_{ed} \cdot v_{sd}}{2\pi(y_s(t) - y_w(t))} \qquad \text{(equ. 10)}$$

Equation 11 results from the condition of constant grinding and grinding wheel dressing peripheral speed:

$$n_s(t) = \frac{v_s}{\pi} \cdot \frac{1}{2(y_s(t) - y_w(t))} \qquad \text{(equ. 11)}$$

The measurable coordinates $y_s(t)$, $y_R(t)$ furnish the possibility for monitoring. During the dressing-grinding process the following must prevail:

$$y_R(t) = y_s(t) + d_R/2 + d_s(t)/2 \qquad \text{(equ. 12)}$$

From the determinations for $v_R$ and $v_{sd}$ the speed quotient $q_d$ is calculated, which is important for dressing with the roller. If the already mentioned coordinates are introduced, there results for $q_d$ an equation according to $$q_d = \frac{v_R}{v_{sd}} = \frac{v_R}{n_s(t)\pi 2(y_s(t) - y_w(t))} \qquad \text{(equ. 13)}$$

It becomes clear that now all important data for the dressing-grinding process can be calculated dependent on initial conditions (index O) and the respective adjoining coordinates. The following is calculable: $v_{frd}(t)$ with equation 10, the control value $y_R(t)$ with equation 12, the speed quotient for dressing $q_d$ with equation 13, and also the required wheel revolutions $n_s(t)$ with equation 11.

Figure 7:
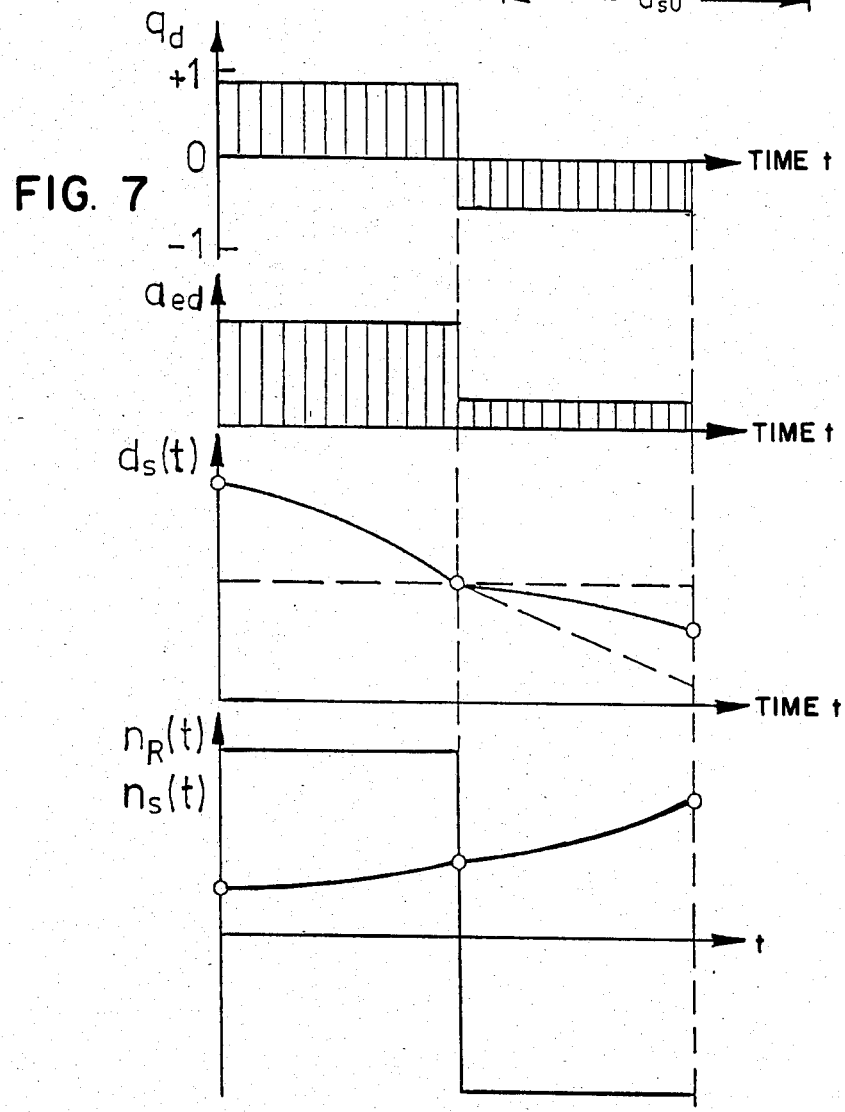
FIG. 7 shows certain phenomena appearing in in a multi-stage grinding process of the present invention.

In principle, the observations made so far also apply to grinding processes which occur in multiple stages. In that case, for example, $q_d$ or $a_{ed}$ can be varied as a function of time or dependent of the condition of the grinding process also, for example, from the dimension of the workpiece. FIG. 7 shows such a basic variation of $q_d$ and $a_{ed}$ as a function of time.

Variations of $q_d$ and $a_{ed}$ are necessary when the dressing conditions are to be adapted to a time-dependent grinding process operation. Thus it must be viewed as practical, for instance, to select during the roughing stage a $q_d$ which is close to +1. This results in a large effective rough depth, which is most suitable for roughing; likewise, a large dressing feed $a_{ed}$ can be selected. If smoothing is to be the next step, it would be more practical to choose $q_d$ toward a negative value, less than 0, and to reduce $a_{ed}$ and thus save grinding wheel volume. In addition, the invention offers the advantage that the dressing roller can be driven by a motor with variable revolutions.

In the above description the index s relates to the grinding wheel, index R relates to the dressing roller, index d to dressing and index f to feed.

In equation 4 and in equations 5 and 6 the grinding wheel diameter $d_s(t)$ or the coordinate difference $y_s(t) - y_w(t)$ appears a function of grinding time t. By means of the coordinate values, which can be easily determined in NC controlled grinding machines with the existing measuring system, the grinding wheel diameter can be calculated at any point in time. From the grinding wheel diamter and $a_{ed}$ and $v_s$ there then results, for example, the required exact plunge-cut speed $v_{frd}$ (equation 4). However, in this indirect measurement of $d_s(t) = y_s(t) - y_w(t)$, thermal deformation of the grinding wheel head or the measuring system is neglected. Besides, one can imagine cases where it is not possible to install a longitudinal measuring system for the position of the dressing roller relative to wheel axis and thus the coordinate $y_R(t)$ for construction or economic reasons.

Figure 8:
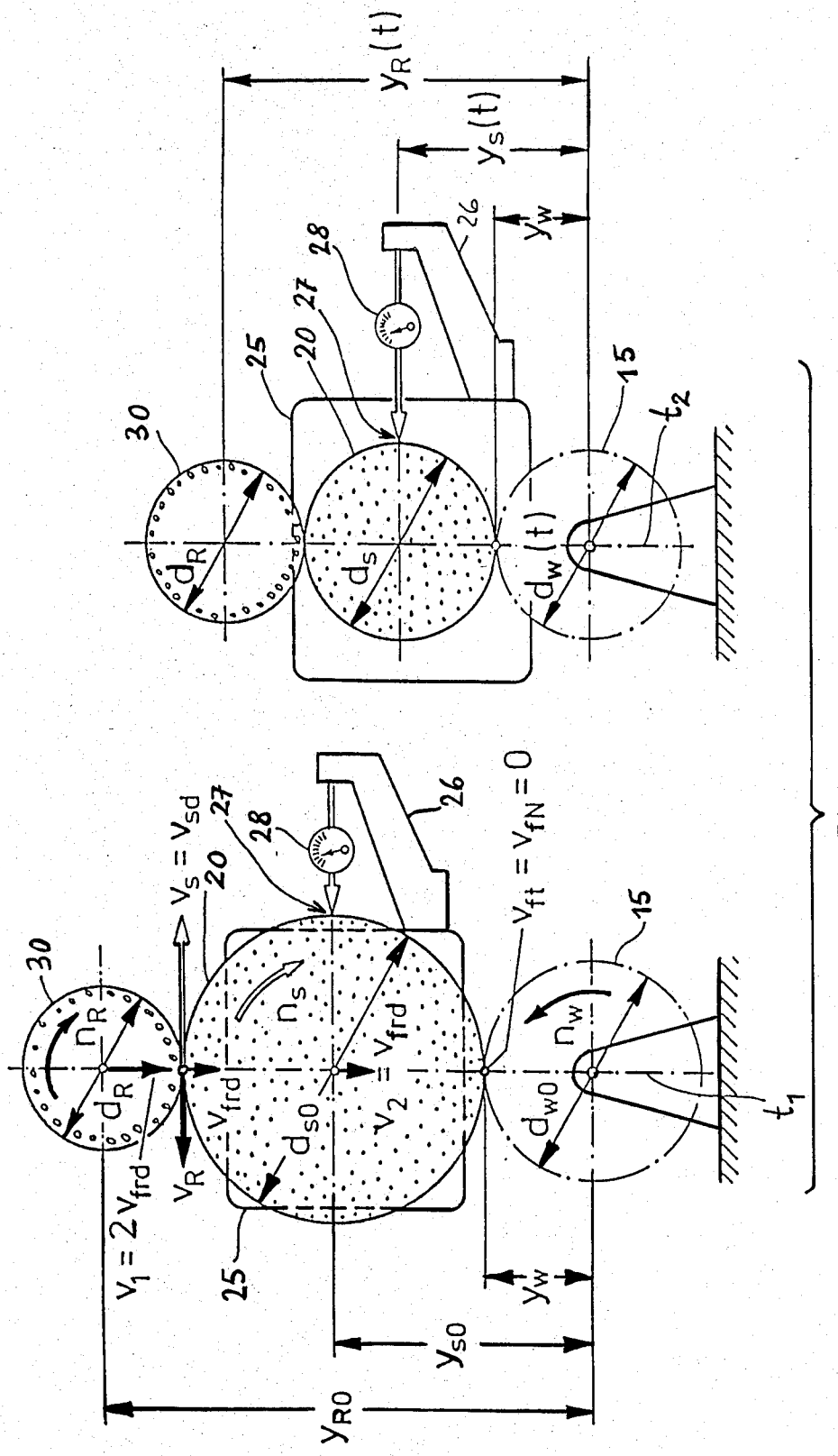
FIG. 8 is a schematic diagram similar to FIG. 2 showing a technique for measuring grinding wheel diameter.

It must therefore be considered to possibly measure the grinding wheel diamter directly. Traditional solutions exist for this purpose. A measuring system for the grinding wheel diameter was described, for example, by Prof. König at the Technische Hochschule Aachen. A second possibility is to use the MAAG process for measuring the grinding wheel diameter. Here, a very small diamond is moved against the grinding wheel contour. The resulting signal, which can be a solids sound signal or an acceleration signal, can be used for measuring purposes. FIG. 8, whose presentation corresponds to that from FIGS. 1 and 2, shows an arm 26, which is attached to the slide 25 of the grinding wheel 20 and carries a measuring device. The diamond point 27 of the measuring device 28 is in constant contact with the periphery of the grinding wheel 20, so that the measuring device 20 continuously measures the diameter reduction of the grinding wheel 20 and makes it available as the output signal for control of the dressing roller speed.

Figure 9:
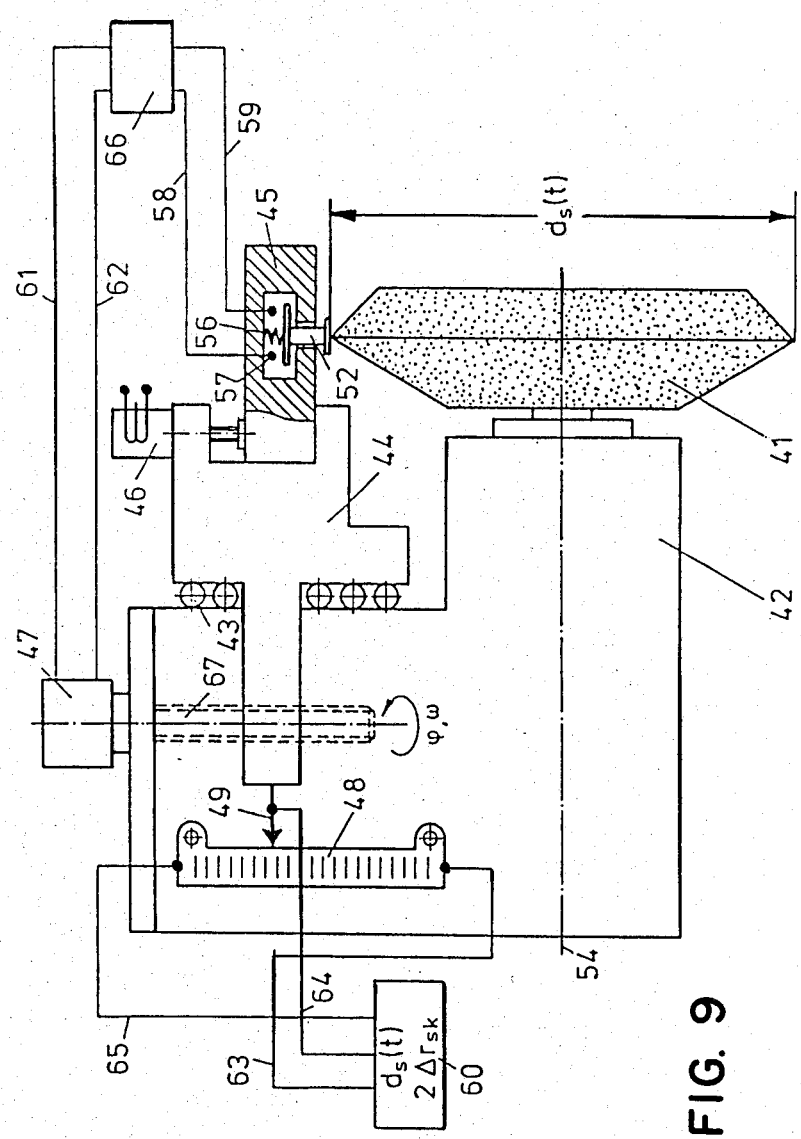
FIG. 9 shows a further technique for measuring grinding wheel diameter.

FIG. 9 shows a device for measuring the grinding wheel diameter. In a headstock 42 a double cone grinding wheel 41 is pivoted around a shaft 54 (dotted line). In its upper portion the headstock 42 is equipped with then is a measure for the bearing strain. If no exterior forces are effective, a voltage $\Delta U$ occurs as a result of the own weight of the spindle, which voltage can be eliminated by a shift of the zero point at the subtractor. Changes in the roll-over expansions because of heating or hydrodynamic processes cause voltages of the same size and direction at the rectifyer outputs, which are eliminated when the electrical difference is formed.

Figure 12:
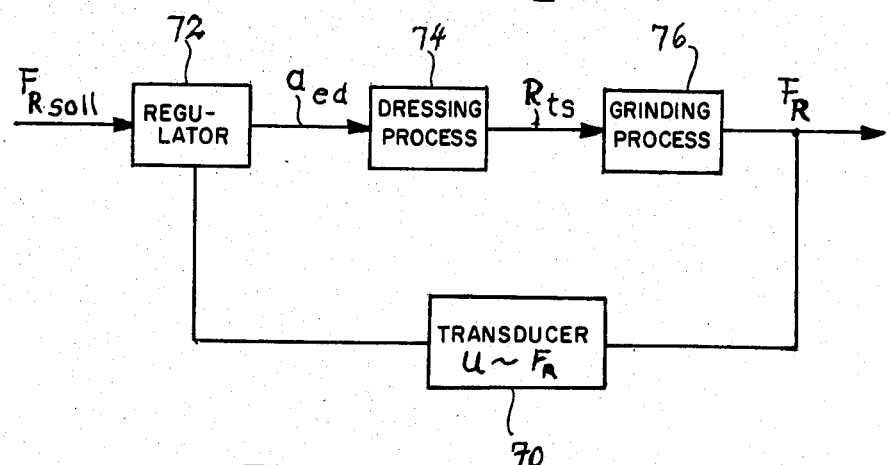
FIG. 12 shows circuitry suitable for use with that of FIG. 11 for compensating the latter for heating or other operating phenomena.

FIG. 12 shows the control circuit required for this. In the simplest form the grinding force $F_r$ is measured and converted into a corresponding actual value signal in the transducer 70; in the regulator 72 the contact thickness $a_{ed}$ is created as an output variable after the input signal of the regulator has been compared with a selected value $f_{rpreset}$ of the cutting power. The contact thickness $a_{ed}$ is the input variable of the dressing process 74. The sharpness of the grinding wheel is characterized, among other things, by the so-called effective rough depth $R_{ts}$, which results from dressing. Thus, the effective rough depth $R_{ts}$ is the output variable of the dressing process and the input variable of the grinding process 76. The grinding force is the output variable of the grinding process. This closes the cycle.

A second possibility for adaptive adjustment via the grinding forces $F_r$ is described in the following.

FIG. 10 shows for the curve 2 two measuring points x and y and different times $t_1$ and $t_2$.

When the rquirement exists that the grinding force $F_r$ as a function of time shall not increase, this can be controlled by measuring the grinding force $F_{r21}$ or $F_{r22}$ at two consecutive points in time and by storing the measuring values. The stored measuring values are subtracted from one another. With a time-constant radial force the grinding force must be $F_{r21}=F_{r22}$. The difference is 0.

This operation can be easily done with a microcomputer. With a negative difference the feed per roller revolution is too small, and $v_{frd}$ must be adjusted accordingly. $v_{frd}$ is the product of $a_{ed}$ and the revolution number of the wheel $n_s(t)$. The number of revolutions $n_s(t)$ of the wheel was already included in equation 1. It can be referred back to.

In another possibility for AC adjustment, the edge wear of the grinding wheel is used as a measured variable. The operation of such a measuring device was explained in FIG. 8. If two consecutive measurements of the grinding wheel diameter $d_s(t)$ at an exposed point, i.e. at the wear-sensitive edges, furnish a certain amount of edge wear, such a signal can be used for dressing.

The dressing can now be done intermittently. This, again, saves grinding wheel dressing volume. The measurement can be made in such a way that the grinding wheel diameter is scanned according to certain pre-set time intervals. If the edge wear $\Delta r_{sk}$ exceeds a specific pre-determined permissible amount, the dressing unit is turned on. After a certain pre-determinable time it can then be lifted off again. FIG. 13 shows the curve of $\Delta r_{sk}$ as a function of time and indicates that for this example the dressing unit started after four time increments $\Delta t$ and remained switched on for a certain time $t_{dc}$. After that time the measurement of $\Delta r_{sk}$ again starts according to pre-set time increments. The process repeats itself. With such an intermittent dressing process—as shown in FIG. 1—one can select, for example, the respective values for $q_d$ and $a_e$ for dressing, which were described previously and which become necessary for maintaining a pre-determined effective rough depth of the cutting wheel.

The effective rough depth was a measurement for the sharpness of the grinding wheel. At the same time, the effective rough depth is a measurement for the anticipated workpiece rough depth. It has been shown in many tests that the effective rough depth and the rough depth of the work piece are correlated. This is understandable when one assumes that with increased effective rough depth, i.e. with an increased grinding wheel circumferential surface, the rough depth of the workpiece must also increase under otherwise constant comparable conditions. Such a measuring device is depicted in FIG. 14. The construction is shown: A piezo element with a scanning needle is excited into oscillations by the roughness of the workpiece, which is moving below the scanning needle at the feed speed $v_{fr}$. The vibration amplitudes are a measurement for the rough depth. The resulting rough depth signal is analogous and continuous and can be processed. For plain plunge-cut grinding the workpiece roughness can be measured as a factor of grinding time in addition to feed distance, grinding force and time tension volume.

The block wiring diagram in FIG. 15 shows the operation of such adaptive adjustment in conjunction with continuous dressing. The workpiece rough depth $R_{tw}$, as the output variable of the grinding process, is measured by a roughness meter 78 as an actual value and returned to the regulator 79, for which a certain workpiece rough depth $R_{twpreset}$ serves for comparison as nominal value. If the existing workpiece rough depth decreases below a certain nominal value $R_{twpreset}$, this indicated a dull smooth wheel. The regulator increases the contact thickness $a_{ed}$ of the dressing slide. The contact thickness $a_{ed}$ as input variable of the dressing process 77, conversely, causes a rougher wheel topography, which is equal to an increase in effective rough depth.

If, on the other hand, the workpiece rough depth increases, this indicates that the dressing unit creates an effective rough depth which is too high. A contact thickness $a_{ed}$ is now put in which is smaller, until finally the rough depth is maintained at uniform measure. An additional advantage of this device is also that the workpiece quality is uniform. The quality of a ground workpiece is also essentially affected by the rough depth of the workpiece.

FIG. 16 shows a construction in which the slide with the dressing roller is separate from the slide of the grinding wheel. 101 is the advance motor for the dressing unit, producing the feed speed $v_{frd}$. The advance motor 101 drives the slide 104, which carries the dressing roller 105, via the screw drive 103. The grinding wheel 106 sits on the grinding slide 107, which is fed in by an advance motor 102 via the screw drive 108 at the angle speed $w_s$ and driven in the feed direction, thus producing the feed spped $v_{fr}$ relative to the workpiece 109. The feed slide 107 itself must have the absolute speed $v_{fr}+v_{frd}$. The device shown in FIG. 16 is a plain plunge-cut operation.

FIG. 14 shows the principle of a rough depth meter, which can be used for continuous rough depth measuring in continuous grinding processes in order to produce via the rough depth $R_{tw}$ a further adaptive adjustment in conjunction with CD processes. This device is also indicated in FIG. 16. 111 is the rough depth sensor and 110 is the frame of the plain plunge-cut grinding machine.

If the radial dressing feed force $F_{rd}$ is measured, for example, according to a principle, as already described in FIG. 10, this can also be used for adaptive adjustment. The principle of the control loop is shown in FIG. 17. The input variable in the dressing process 98 is again the contact thickness $a_{ed}$. It can be measured, for example, via the radial bearings in the dressing roller shaft. It is returned and fed to an actual value into the regulator 99. The latter compares the actual value of the radial force with the nominal value of the radial force. Subsequently a radial contact thickness $a_{ed}$ can now be put out for the dressing roller relative to the grinding wheel. In such adjustment, the speed of plunge-cutting between roller and wheel can be dealt with independent of the other, mostly interrelated, limiting quantities. For example, a dressing radial force $F_{rd}$ can be used which is relatively small, which, in turn, results in a very small contact thickness $a_{ed}$; this leads to a low wheel loss volume flow. Thus, the economy can be improved without an unfavorable grinding process. In addition, an excessive increase of the radial force $F_{rd}$ can be avoided, which could lead to undue distortion and oscillations.

FIG. 18 is a modified and simplified version of FIG. 2, showing a jet lapping unit, which consists of pump, valve and blast nozzle. The liquid is sprayed against the grinding wheel with a pressure of 100 bar and above. This is practically a sharpening process which, however, does result in the same grinding wheel volume flow as in actual dressing. If such jet lapping is combined with the previously described AC devices, for example with a measurement of the dressing radial force $F_{rd}$ or with the cutting force $F_r$, a starting signal can be given for the dressing roller as soon as a certain limit value is exceeded. This could be based on the following strategy:

To begin with, only the grinding operation and the jet lapping process will be running. The dressing unit is idle. At the same time the grinding normal force or radial force is measured. If this force increases beyond a specific, preset value, the dressing unit is started. In this way an intermittent method can be achieved between dressing with high pressure rinsing, or jet lapping, as needed and adapted to the respective occurring disturbance variables during grinding, such as inhomogeneity of the workpiece material.

Altogether, one can use one or more dressing blocks per grinding wheel in place of one or more diamond rollers per grinding wheel. Combinations of dressing roller and dressing block are imaginable. For example, the grinding wheel could be dressed with a dressing block during roughing, and with a diamond roller during finishing or vice versa. This depends on the concentration of the diamonds on the dressing tools and on the size of the individual diamonds.

FIG. 19 shows the device and the control for simultaneous grinding and dressing on a plain plunge-cut grinding machine. In the construction chosen for this example the slide with the dressing roller is separate from the slide with the grinding wheel.

The element 121 is the advance motor for the dressing unit for producing the feed speed $v_{frd}$. The advance motor 121 drives the slide 124 via the screw drive 123. The slide 124 carries the dressing motor 125, the dressing roller 122, which is driven by the dressing motor 125, and the odometer 126, which measures the height of the dressing roller shaft above the workpiece axis $y_R$ with the help of the frame-mounted scale 127. The dressing spindle 128 is supported in the dynamometer bearing 129, which supplies a signal corresponding to the dressing radial force $F_{rd}$.

The grinding wheel 10 is driven by the grinding motor 11. The height of the grinding wheel shaft above the workpiece axis $y_s$ is measured by the odometer 13. The odometer 13, the grinding wheel 10 and the grinding motor 11 are located on the slide 12, which is driven by an advance motor 14 and thus produces the feed speed $v_{fr}$ relative to the workpiece 17.

Furthermore, the slide 12 carries the above described measuring device 15 for the direct measurement of the grinding wheel diameter $d_s$; the feeler 16 of the measuring device 15 radially scans the grinding wheel casing surface on a flying circle.

The workpiece 17 is driven via the spindle 18, which is supported by the dynamometer bearing 19. The dynamometer bearing 19 supplies a signal $U_{Fr}$ for the radial force during grinding $F_r$. A diameter meter 20 mounted on the frame directly measures the workpiece diameter $d_w$ or, on the flying circle of a certain profile point, the diameter $d_R$. A roughness meter 21 supplies a signal $U_{Rt}$ for the workpiece rough depth $R_t$.

In case the grinding wheel diameter $d_s$ is not measured directly, it is selectively determined by the logic elements 22 or 23 from the measuring variables $d_w$ and $y_s$, or $y_s$ and $y_R$, and from the roller diameter $d_R$ from the constant transmitter 24. From $d_s$ and the grinding wheel circumferential speed $v_s$ from the constant transmitter 26, the logic element 25 determines the grinding wheel RPM $n_s$, which produces the control signal for the grinding motor 14. The logic element 27 calculates the radial feed speed during dressing $v_{rfd}$ from $n_s$ and the contact thickness during dressing $a_{ed}$, whereby $a_{ed}$ can be determined according to several viewpoints by transmitters which are different, in each case. The logic element 28 supplies from $v_{frd}$ and the radial feed speed during grinding $v_{fr}$ from the constant transmitter 29 the control $v_2$ for the feed speed of the slide 12; correspondingly, the logic element 30 supplies the control signal $v_1$ for the feed speed of the slide 1. From $v_s$ from the constant transmitter 26 and the speed ratios during dressing $q_d$, which can be selected according to various criteria, the logic element 31 calculates the dressing roller circumferential speed $v_R$. The logic element 32 calculates from $v_R$ and $d_R$ from the constant transmitter 24 the control signal $n_R$ for the RPM of the dressing motor 5.

The advance of $a_{ed}$ and $q_d$ can occur according to various methods. As was shown in (a) and already described in FIG. 7, the constant transmitters 33 and 34 supply values for $q_d$ and $a_{ed}$ according to a fixed program. As shown in (b) to (e), $q_d$ is advanced by the constant transmitter 33 according to a fixed program, however, $a_{ed}$ is adjusted adaptively, so that nominal values for process and quality characteristic quantities are maintained. Accordingly, the constant transmitters 35, 36, 37 and 38 supply nominal values for the radial force during grinding $F_{rnom}$, the edge wear of the grinding wheel $\Delta r_{sk\ nom}$, the workpiece rough depth $R_{tw\ nom}$ or the radial force during dressing $F_{rd\ nom}$. From the measured signals the actual values $F_{r\ act}$, $\Delta r_{sk\ act}$, $R_{tw\ act}$ or $F_{rd\ act}$ are determined by the measuring transformers 39, 41, 42 or the logic element 40. The comparators 43, 44, 45, 46 determine from the respective difference between nominal and actual value an advance value for $a_{ed}$.

The invention is equally applicable in plain grinding and surface grinding of workpieces.

The attached drawing is to be viewed as an independent disclosure document in case the above description explains the invention incompletely or not clearly.

I claim:

1. A process for grinding a workpiece to a predetermined profile by a grinding machine having a controllably rotatable grinding wheel movable toward the workpiece, said machine having a controllably rotatable dressing roller movable toward the grinding wheel, said method comprising the steps of:

rotating the grinding wheel and applying same to the workpiece for grinding the workpiece;

rotating the dressing roller and applying same to the grinding wheel during the grinding for dressing the grinding wheel;

controlling the rotational speed ratio between the grinding wheel and the dressing roller to maintain the predetermined effective rough depth of the grinding wheel;

measuring the diameter of the grinding wheel and the geometric coordinates of the workpiece and grinding wheel; and adaptively feeding the dressing roller toward the grinding wheel in accordance with the measured diameter of the grinding wheel and the geometric coordinates of the workpiece and grinding wheel.

2. The process according to claim 1 further defined as detecting the actual positions of the grinding wheel and dressing wheel and the actual dimension of the workpiece for controlling the rotational speed ratio between the grinding wheel and the dressing roller.

3. The process according to claim 1 wherein the process is so controlled that the diameter of the dressing roller and of the grinding wheel and the positions of the roller and the wheel are controlled for maintaining the relation $$y_R(t) = y_S(t) + (d_R/2) + (d_S(t)/2)$$

wherein $y_R(t)$ is the position of the roller at time t, $y_S(t)$ is the position of the grinding wheel at time t, $d_R$ is the diameter of the roller and $d_S$ is the diameter of the grinding wheel.

4. The process according to claim 1 further comprising the step of detecting the radial force on one of the workpiece or grinding wheel; comparing the grinding force to a reference value; and controlling the dressing of the grinding wheel and depth of engagement of the grinding wheel into the workpiece in accordance therewith.

5. The process according to claim 2 further comprising the step of detecting the radial force on one of the workpiece or grinding wheel; comparing the grinding force to a reference value; and controlling the dressing of the grinding wheel and depth of engagement of the grinding wheel into the workpiece in accordance therewith.

6. The process according to claim 3 further comprising the step of detecting the radial force on one of the workpiece or grinding wheel; comparing the grinding force to a reference value; and controlling the dressing of the grinding wheel and depth of engagement of the grinding wheel into the workpiece in accordance therewith.

7. The process according to claim 1 wherein the grinding wheel has edge attrition during grinding, said process including the step of ascertaining the edge attrition of the grinding wheel; and activating the dressing roller for minimizing the depth of engagement of the grinding wheel into the workpiece while maintaining the accuracy of the profile grinding.

8. The process according to claim 1 further including the step of detecting the grinding force; comparing the grinding force with a reference; and controlling the dressing of the grinding wheel in accordance therewith.

9. The process according to claim 1 wherein the dressing roller has a shaft and wherein the process includes the steps of detecting the radial dressing force at the shaft; comparing the radial dressing force with a reference, controlling one of the depth of engagement of the grinding wheel into the workpiece or the speed of the plunge-cutting of the dressing roller into the grinding wheel in accordance with said comparison.

10. A grinding machine for grinding a workpiece to a predetermined profile comprising:

a frame;

a grinding wheel mounted on a grinding wheel carrier supported by said frame and movable with respect thereto;

a dressing roller mounted on a dressing roller carrier supported by said frame and movable with respect thereto;

controllable drive motor means for rotating said grinding wheel and said dressing roller;

control means for controlling said motor;

means for measuring the dimension of the workpiece parallel to the radius of said grinding wheel;

means for determining the height of the axis of the grinding wheel above said workpiece;

logic means for determining the diameter of the grinding wheel from dimension of the workpiece, the position of the grinding wheel, and from the computed diameter of the dressing roller for controlling the movement of the said dressing roller toward said grinding wheel.

11. The grinding machine according to claim 10 further including logic means for providing a grinding wheel speed control signal to said motor control means based on the diameter of the grinding wheel, and from the computed grinding wheel peripheral speed.

12. The grinding machine according to claim 10 further including logic means for determining the radial feed speed during dressing from the speed of the grinding wheel and the depth of engagement of the grinding wheel in the workpiece.

13. The grinding machine according to claim 10 further including logic means for determining the feed speed of the dressing roller carrier from the radial feed speed during dressing and the radial feed speed during grinding.

14. The grinding machine according to claim 10 further including logic means for determining the feed speed of the grinding wheel carrier from the radial feed speed during dressing and from the radial feed speed during grinding.

15. The grinding machine according to claim 10 further including logic means for providing a dressing roller speed control signal to said motor control means from the height position of the axis of the dressing roller above the workpiece and from the computed diameter of the dressing roller.

16. The grinding machine according to claim 10 further including means providing a plurality of signals representing the radial force during grinding, the edge attrition of the grinding wheel, the workpiece rough depth, and the radial force during dressing, said means being coupled to said logic means for forming error signals for determining the depth of engagement during dressing.

17. The grinding machine according to claim 10 further including a jet sharpening unit for sharpening the grinding wheel in addition to said dressing roller.

* * * * *

UNITED STATES PATENT AND TRADEMARK OFFICE
CERTIFICATE OF CORRECTION

PATENT NO. : 4,640,057

DATED : February 3, 1987

INVENTOR(S) : Ernst Salje

It is certified that error appears in the above-identified patent and that said Letters Patent is hereby corrected as shown below:

Substitute attached Fig. 19 for Fig. 19 of this patent.

Signed and Sealed this

Fifth Day of April, 1988

Attest:

DONALD J. QUIGG

Attesting Officer     Commissioner of Patents and Trademarks